US006396070B1

(12) United States Patent
Christensen et al.

(10) Patent No.: US 6,396,070 B1
(45) Date of Patent: May 28, 2002

(54) ADJUSTABLE SENSOR ASSEMBLY FOR PRINTERS

(75) Inventors: Christopher Roy Christensen, Clermont; William M. Bouverie, Windemere, both of FL (US)

(73) Assignee: Datamax Corporation, Orlando, FL (US)

( * ) Notice: Subject to any disclaimer, the term of this patent is extended or adjusted under 35 U.S.C. 154(b) by 0 days.

(21) Appl. No.: 08/977,262

(22) Filed: Nov. 24, 1997

(51) Int. Cl.[7] .......................................... G01N 21/86
(52) U.S. Cl. .............................. 250/559.29; 250/239
(58) Field of Search ......................... 250/559.29, 239, 250/227.22, 227.21; 356/375; 400/279

(56) References Cited

U.S. PATENT DOCUMENTS 4,019,935 A 4/1977 Harvey ....................... 346/136
4,795,281 A * 1/1989 Ulinski, Sr. et al. .......... 400/74
5,438,349 A 8/1995 Fox et al. ................... 346/136
5,507,583 A 4/1996 Beaty et al. ........... 250/559.11
5,534,890 A 7/1996 Krug et al. ................ 347/193
5,563,686 A 10/1996 Beaufort et al. ............ 355/206
5,564,845 A 10/1996 Yamaguchi et al. ........ 400/582
5,570,962 A 11/1996 Suzuki et al. .......... 400/120.16
5,587,728 A 12/1996 Edgar .......................... 347/19
5,588,761 A 12/1996 Seib ........................... 400/579
5,613,790 A 3/1997 Miazga ........................ 400/708
5,619,240 A 4/1997 Pong et al. ................. 347/103
5,650,730 A 7/1997 Herbst, Jr. .................. 324/690
5,802,973 A * 9/1998 Mueller et al. ............. 101/183

OTHER PUBLICATIONS

Patent Abstracts of Japan, vol. 96, No. 10, Oct. 31, 1996 & JP 0851167, Jun. 11, 1996.

Patent Abstracts of Japan, vol. 16, No. 359 (M–1289), Aug. 4, 1992 & JP 04 112 063, Apr. 14, 1992.

* cited by examiner

*Primary Examiner*—Que T. Le
(74) *Attorney, Agent, or Firm*—Dilworth & Barrese, LLP

(57) ABSTRACT

A print media sensor mounting assembly includes a housing having a sensor mounting element. The sensor mounting element has a sensor position movably mounted therein for movement of the sensor position to a plurality of predetermined positions corresponding to a width of a print media web.

4 Claims, 5 Drawing Sheets

FIG. 3
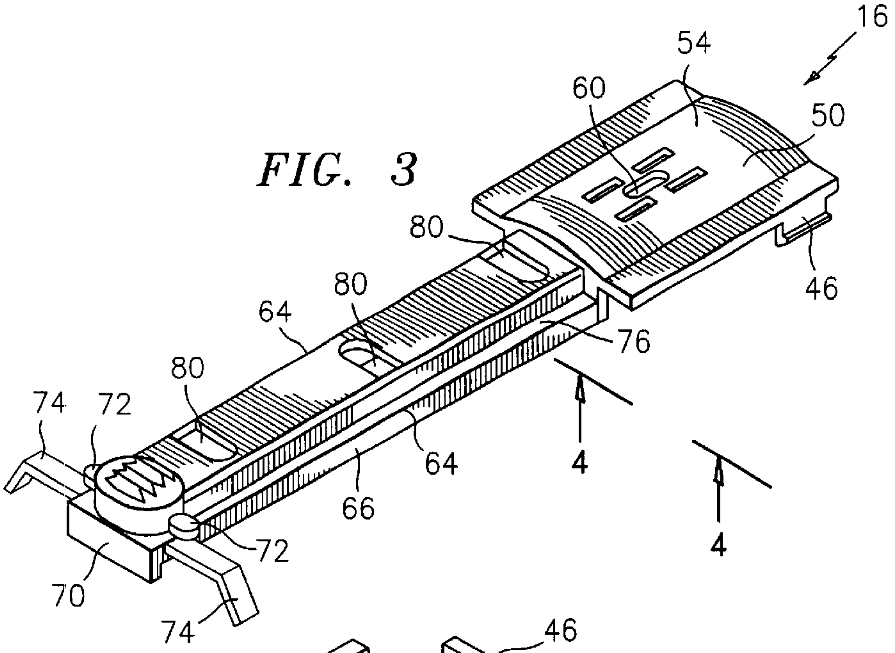
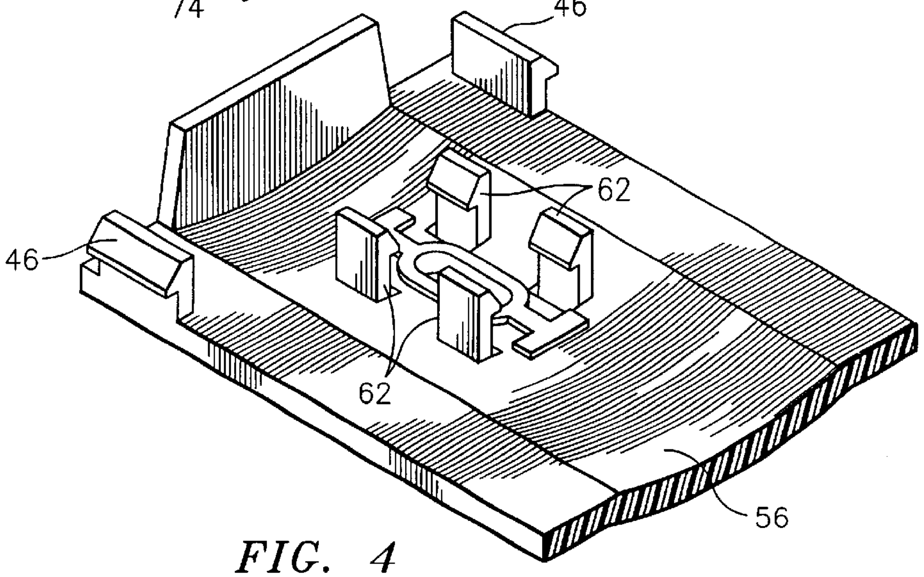
FIG. 4
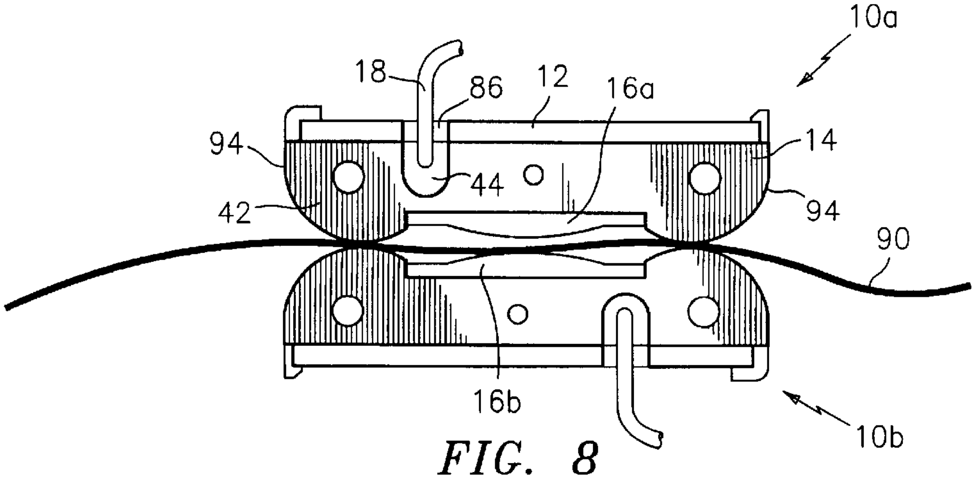
FIG. 8

ADJUSTABLE SENSOR ASSEMBLY FOR PRINTERS

BACKGROUND OF THE INVENTION

1. Field of the Invention

This disclosure relates to a sensor assembly and, more particularly, to a adjustable sensor assembly for determining the location of at least one edge of print media.

2. Description of the Related Art

Printer sensors are typically used to determine the presence and location of the edge of the print media during operation. The printer requires a reference position in order to begin printing. This ensures that an appropriate location is available in the print area and that edge or over the edge printing does not occur. It is also desirable to be able to distinguish between labels, for example, on a continuous supply roll. The printer, therefore, can determine the appropriate start and finish locations on the print media in order to place a printed bar code, for example, on the appropriate label and advance the print media to the next location in a reliable and efficient manner.

Sensors are used to determine the position of a label within a print head, that is, the distance that the print media has advanced. Traditional optical means of detecting the position of labels, for example, include a "through beam" system wherein an emitter is placed on one side of the label and a detector is placed on the reverse side. There are two methods of using "through beam" technology. These include gap and stripe indication. In the gap indication method light is passed through the print media and gaps between labels are sensed as a change in light intensity.

Stripe indication senses a black stripe printed on either side of the print media. When the indicator stripe is present, the light from the emitter does not pass through the labels and is not detected by the detectors. Stripe sensing can also be performed from one side of the media, a light source shines on the print media and the reflection is sensed to determine the position of the print media.

In order for the position sensor to work properly the black stripe must be in line with the sensor. When various print media sizes are used, printers are typically provided with an additional sensor at each location for each size of the print media. This increases the complexity and cost for the printer, however, since numerous sensors are needed to accommodate print media of different sizes. Some printers typically require that the single sensor be removed and remounted each time a different size media is used.

Printer versatility is desirable. Therefore a need exists for a sensor which can be easily adjusted to allow the use of various sized print media in the printer. A further need exits for such a sensor wherein the sensor is readily accessible and therefore does not require difficult disassembly steps in order to adjust the sensors position.

SUMMARY OF THE INVENTION

A print media sensor mounting assembly includes a housing having a sensor mounting element. The sensor mounting element has a sensor position movably mounted therein for movement of the sensor position to a plurality of predetermined positions corresponding to a width of a print media web.

In particularly preferred embodiments, the printer sensor assembly includes a base defining a slot. A slide, for mounting a sensor therein, is slidably mounted within the slot and has at least one bump. A plurality of detents have predetermined locations formed within the base adjacent to the slot such that the slide is adjustably positioned and releasably secured in a predetermined location when the at least one bump engages the detents.

The sensor assembly may include a distal end portion of the slide having lateral extensions extending perpendicularly from a longitudinal axis and engaging a lower surface of the base. The lateral extensions may have at least one bump disposed thereon. The lateral extensions may be used to provide a force for holding bumps within a detent position, wherein the lateral extensions extend downward defining a bowed structure such that when the bowed structure is deflected a force is exerted. A cover plate may be used for attaching to the base such that the bowed structure is deflected to provide a preload force for holding bumps within a detent position. The sensor assembly can include a light sensor.

BRIEF DESCRIPTION OF THE DRAWINGS

The invention will be described in detail in the following description of embodiments with reference to the following figures wherein:

FIG. 3 is an isometric view of a sensor slide;

FIG. 4 is an isometric view of a lower surface of a first end portion of the sensor slide shown in FIG. 3;

FIG. 8 is an end view of two sensor assemblies in placed in an operative position relative to one another;

DETAILED DESCRIPTION OF THE PREFERRED EMBODIMENTS

The present disclosure describes an adjustable sensor assembly for printers. In order to sense the boundaries between labels, for example, or the position of an indicator stripe, sensors are installed inside a printer in an area where a print head is located. The adjustable sensor provides a sensor slide which adjusts the location of a sensor mounted thereto. A sensor base provides a plurality of preset locations and locks the slide and sensor in place when the desired location is set. The plurality of preset locations correspond to standard size print media.

Figure 1:
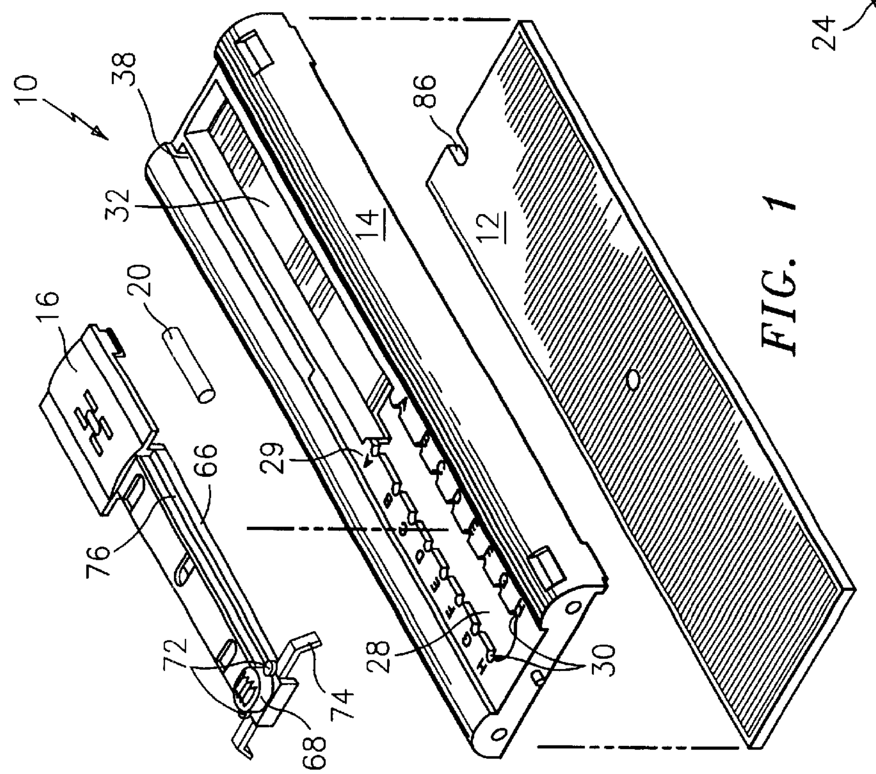
FIG. 1 is an exploded view showing the components of an adjustable sensor assembly.

Referring now in specific detail to the drawings in which like reference numerals identify similar or identical elements throughout the several views, and initially to FIG. 1, one embodiment of an adjustable sensor assembly constructed in accordance with the present disclosure is shown generally as adjustable sensor assembly 10. Adjustable sensor assembly 10 includes a sensor base 14, a sensor slide 16, a cover plate 12 and a sensor 20.

Figure 2:
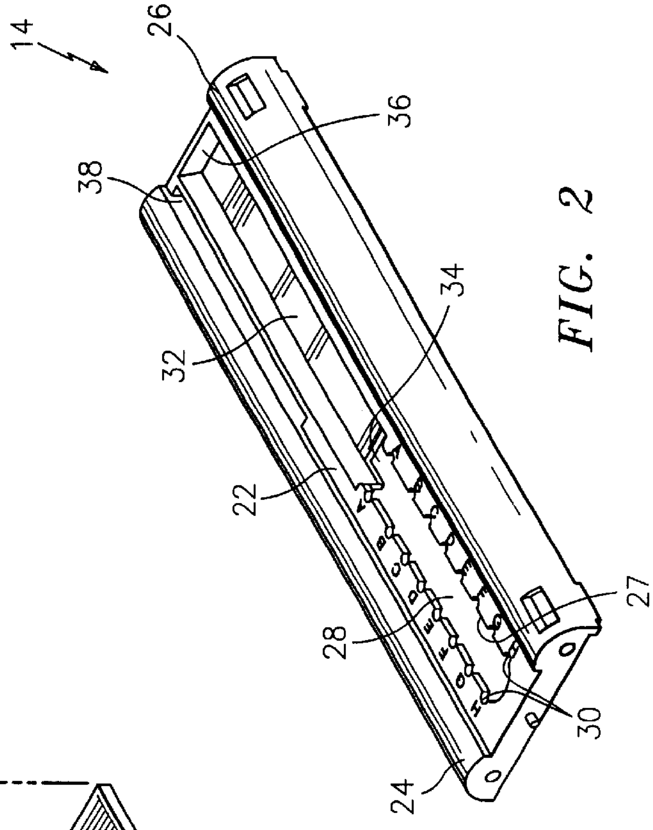
FIG. 2 is an isometric view of a sensor base.

Referring to FIG. 2, sensor base 14 has a front face 22, first end portion 24 and a second end portion 26. Front face 22 of sensor base 14 has a slot 28 on first end portion 24 with a plurality of opposing detent pairs 30 formed at a lateral boundary 27 of the slot 28. Slot 28 is formed longitudinally through sensor base 14. Front face 22 forms a recess 32 on second end portion 26 along the longitudinal axis of sensor base. Recess 32 extends below front face 22 and remains parallel thereto. Recess 32 forms an open end 34 and a closed end 36. Closed end 36 is located on second end portion 26. Open end 34 leads into slot 28 and communicates therewith. A pair of slots 38 is located adjacent to either side of recess 32 and extend substantially the length of recess 32. The preferred material for sensor base 14 is a moldable polymer.

Referring to FIGS. 3 and 4, sensor slide 16 has a first end portion 50, a second end portion 52, an upper surface 54 and a lower surface 56. Second end portion 52 extends longitudinally from first end portion 50. First end portion 50 has a center hole 60 therethrough and extended clips 62 extending from lower surface 56 for securing a sensor (not shown) adjacent to center hole 60. Center hole 60 is provided to allow light signals to pass therethrough. Power and signals to the sensor are provided through a cable 18. See FIG. 9. The sensor is mounted on lower surface 56 of first end portion between extended clips 62 during operation. Cable 18 is connected to the sensor and is routed longitudinally through the second end portion 52 and secured within sensor slide 16 by wire guides 80. First end portion 50 has extensions 46 extending downward for slidably engaging slot 38 of sensor base 14. Second end portion 52 has lateral sides 64. Each lateral side 64 has a step 66 formed thereon. Second end portion 52 has a finger pad 68 disposed on upper surface 54 adjacent to an end 70 of sensor slide 16. Two bumps 72 are formed on lateral sides 64 on a top surface 76 of steps 66. End 70 also includes lateral extensions 74 disposed perpendicularly from the longitudinal axis and remaining below top surface 76 of steps 66. The preferred material for sensor slide 16 is a moldable polymer.

Referring again to FIG. 1, sensor slide 16 fits into recess 32 and slot 28 such that lateral extensions 74 and top surface 76 of steps 66 engage a lower surface 58 of sensor base 14. See FIG. 5. Extensions 46 clip into slots 38 which act as guides for sensor slide 16 and secure slide 16 to sensor base 14. Sensor base 14 supports sensor slide 16 and allows longitudinal translation between detent pairs 30 of sensor base 14. Opposing pairs of detents 30 are formed to receive two bumps 72 in order to set a location for sensor slide 16 and sensor 20. When cover plate 12 is installed on sensor base 14, lateral extensions 74 engage the surface of cover plate 12. Lateral extensions 74 elastically deflect placing an upward force on second end portion 52 of sensor slide 16. This force maintains bumps 72 in pair of detents 30 locking sensor slide 16 in a fixed location. If adjustment of sensor slide 16 is desired, finger pad 68 is depressed releasing two bumps 72 from pair of opposing detents 30. Sensor slide 16 can now be repositioned and locked in place by releasing finger pad 68 at a new detent position.

In a preferred embodiment, eight pairs of detents 30 are positioned along slot 28. The detents 30 are spaced from a predetermined reference location to allow adjustment of sensor 20 for standard sized print media, for example bar coded labels. It is contemplated that slot may have more detents 30 to allow more versatility of the printer. Detents 30 are marked to identify each location to provide the user with a set of reference labels 29, for example letters, to more easily determine the appropriate setting for the print media being used. It is further contemplated that sensor slide 16 can be locked in place at preset positions in a variety of ways. For example, sensor slide can have tabs laterally disposed for locking tabs into recesses within the slot.

Figure 6:
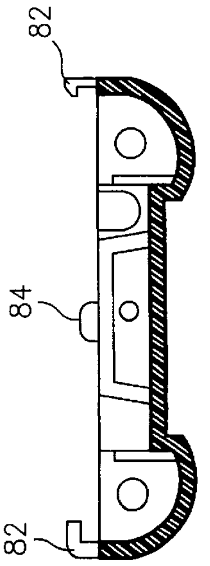
FIG. 6 is a sectional view of the sensor base sectioned along the line indicated in FIG. 5.
Figure 5:
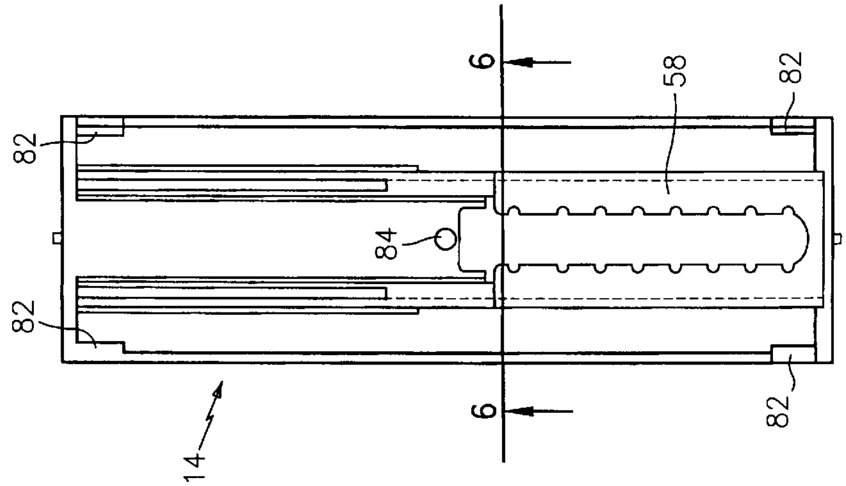
FIG. 5 is a bottom view of the sensor base.

Referring now to FIGS. 5 and 6, cover plate 12 (FIG. 1) is installed onto lower surface 58 of sensor base 14. Lower surface 58 of sensor base 14 is equipped with clips 82 and a pin 84 in order to secure cover plate 12 to sensor base 14. Cover plate 12 defines an opening 86 on one end to allow cable 18 to pass. Sensor base 14 may be mounted to a surface adapted to receive clips 82 and pin 84 without the use of cover plate 12. The surface functions as cover plate 12 providing engagement to lateral extensions 74 to maintain bumps 72 within pair of detents 30.

Figure 7:
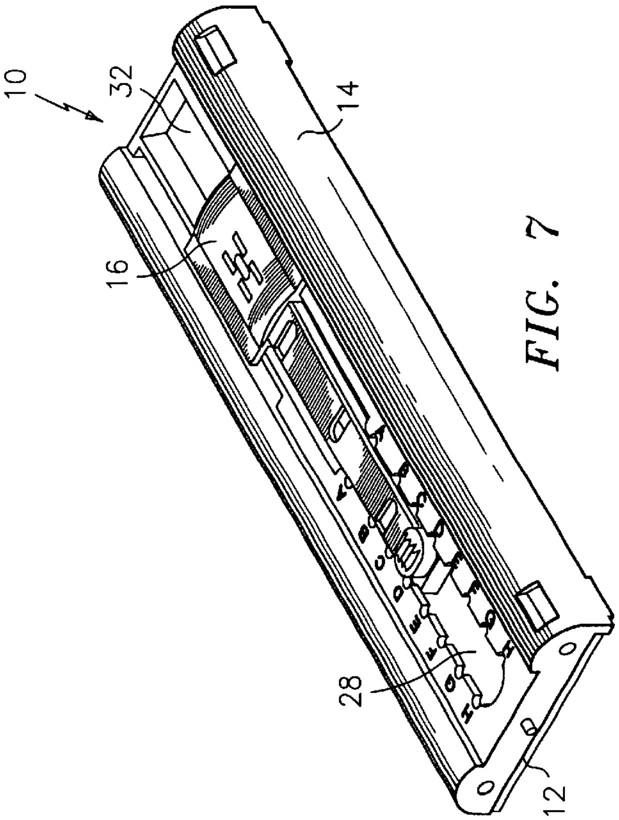
FIG. 7 is an isometric view of an assembled adjustable sensor assembly.

Referring to FIG. 7, an adjustable sensor assembly 10 is assembled showing sensor slide 16 mounted within slot 28 and recess of 32 of sensor base 14. Cover plate 12 is shown mounted to sensor base 14.

Referring to FIG. 8, a working configuration is shown. A first sensor assembly 10*a* is installed above print media 90 and a second sensor assembly 10*b* is placed below print media 90. Sensor base 14 has rounded edges 94 to aid in passing print media 90 therebetween. First sensor assembly 10*a* transmits a light impulse from sensor source (shown as part of sensor 16*a*) through print media 90 to second sensor assembly 10*b* where the signal is received by a detector (shown as part of sensor slide 16*b*). Sensors can be used to determine if print media is present, to read a position indicating stripe, to determine the location of the print media edge or to measure the presence of gaps for labels. When print media is changed, for example, a 4 inch wide label is replaced in printer by a 3.5 inch label. Sensor slides 16*a* and 16*b* are repositioned to corresponding detent positions to accommodate the new size of print media 90.

Power and signals to the sensor source and detector are provided through cable 18. Cable 18 is connected to the sensor source or detector and secured within sensor slide 16 by wire guides 80. See FIG. 3. Cable 18 passes around recess 32 to a second end 42 of sensor base 14. Second end 42 defines an opening 44 to allow cable 18 to pass therethrough. Opening 86 in cover plate 12 corresponds to opening 44 and provides additional clearance for cable 18. Slack must be stored within cable 18 to allow adjustment of sensor slide 16 within sensor base 14. This is accomplished by routing cable 18 around recess 32. Cable 18 is similarly routed in second sensor assembly 10*b*.

It is also contemplated that sensor assembly 10 can be used with a reflected light sensor, in which case, the sensor is both a source and a detector of light, requiring only one sensor assembly 10. In this case, print media 90 passes over sensor assembly 10 reflecting light back to sensor assembly which is read and processed.

Figure 9:
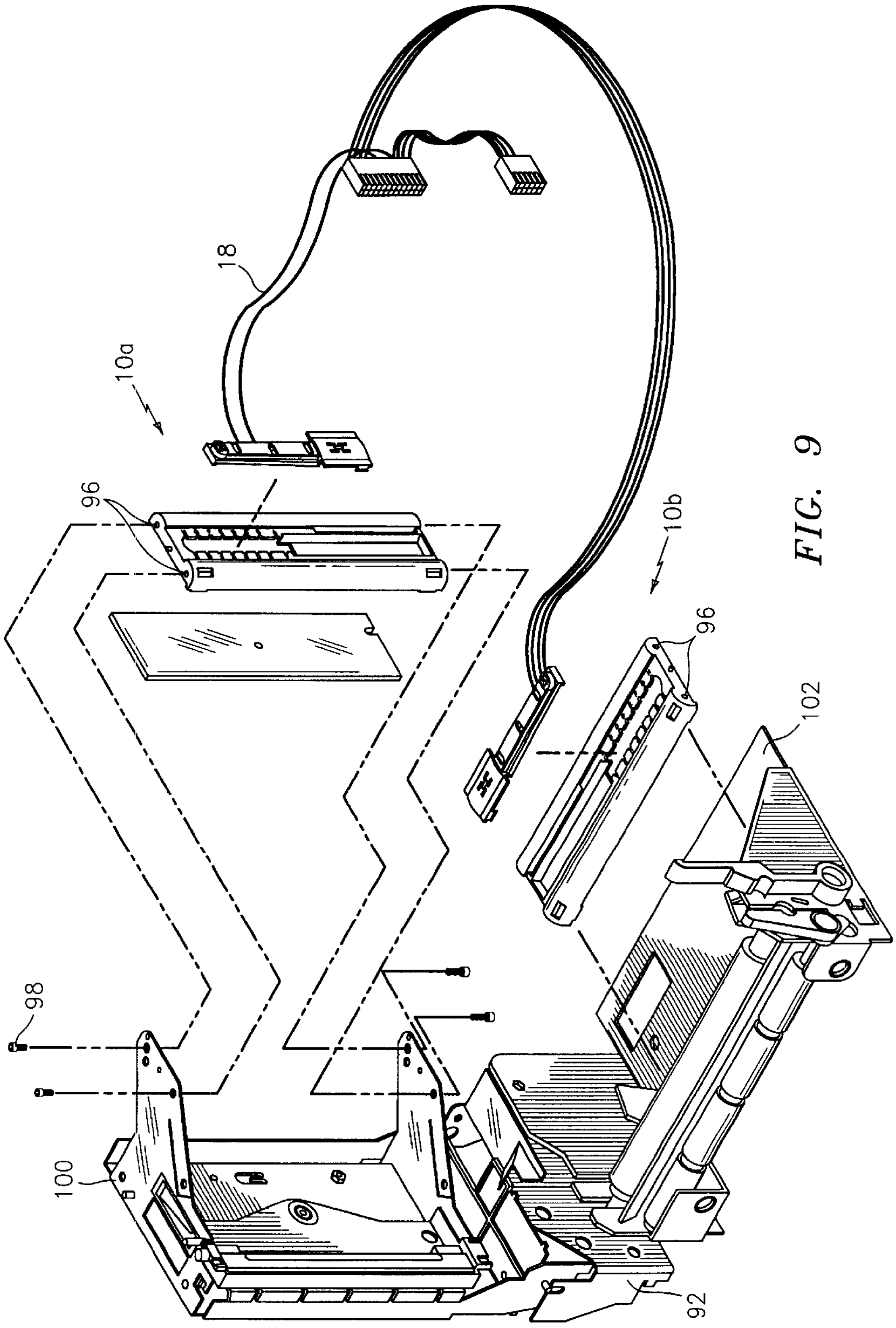
FIG. 9 is an exploded view of two sensor assemblies being installed within a print media feed.

Referring now to FIG. 9, a first sensor assembly 10*a* is installed above a print media feed 92 and a second sensor assembly 10*b* is placed below print media feed 92. Sensor assembly 10*a* and 10*b* each have a pair of threaded holes 96 at each end for securing to print media feed 92 by screws 98. First sensor assembly 10*a* mounts to a top 100 of print media feed 92 and second sensor assembly 10*b* mounts to a bottom 102 of print media feed 92.

Figure 10:
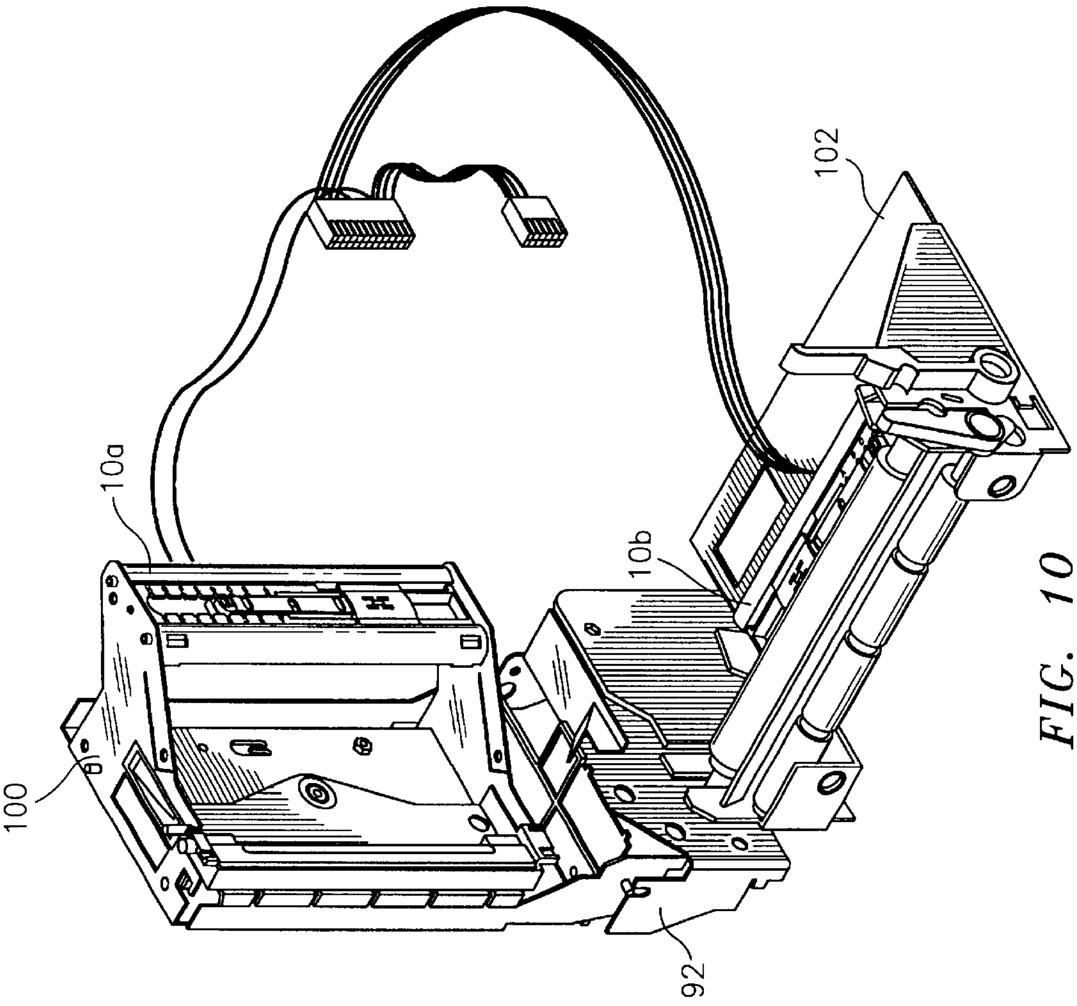
FIG. 10 is an isometric view of two sensor assemblies installed within a print media feed.

Referring to FIG. 10, top 100 rotates up to allow access to easily adjust sensor assemblies 10*a* and 10*b*. During operation, top 100 is rotated down so that the sensor source of sensor assembly 10*a* can communicate with the sensor detector of sensor assembly 10*b* as shown in FIG. 8. In preferred embodiments, a light emitting diode or laser acts as a sensor source.

Having described preferred embodiments of a novel sensor assembly (which are intended to be illustrative and not limiting), it is noted that modifications and variations can be made by persons skilled in the art in light of the above teachings. For example, it is contemplated that the sensor assembly can have remote adjustment capability. It is therefore to be understood that changes may be made in the particular embodiments of the invention disclosed which are within the scope and spirit of the invention as delined by the appended claims. Having thus described the invention with the details and particularity required by the patent laws, what is claimed and desired protected by Letters Patent is set forth in the appended claims:

What is claimed is:

1. A print media sensor mounting assembly comprising:

a housing having a sensor mounting element having a sensor position movably mounted therein for movement of the sensor position to between a multiplicity of predetermined finite positions corresponding to a width of a particular print media web, wherein the sensor mounting element is structured and arranged to be locked in each predetermined finite position.

2. A print media sensor mounting assembly as recited in claim 1 wherein the housing comprises a base defining a slot for receiving the sensor mounting element therein.

3. A print media sensor mounting assembly as recited in claim 1 further comprises a sensor mounted at the sensor position.

4. A print media sensor mounting assembly as recited in claim 1 wherein the sensor position is securable at each predetermined position.

* * * * *